US012745318B2

(12) United States Patent
Kim

(10) Patent No.: US 12,745,318 B2
(45) Date of Patent: Sep. 22, 2026

(54) METHOD AND APPARATUS FOR DISCONTINUOUS RECEPTION IN WIRELESS MOBILE COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam (KR)

( * ) Notice: Subject to any disclaimer, the term of this patent is extended or adjusted under 35 U.S.C. 154(b) by 259 days.

(21) Appl. No.: 18/754,161

(22) Filed: Jun. 26, 2024

(65) Prior Publication Data

US 2025/0008600 A1 Jan. 2, 2025

(30) Foreign Application Priority Data

Jun. 27, 2023 (KR) ........................ 10-2023-0082415

(51) Int. Cl.
*H04W 76/28* (2018.01)

(52) U.S. Cl.
CPC .................................. *H04W 76/28* (2018.02)

(58) Field of Classification Search
CPC ..................................................... H04W 76/28
USPC ......................................................... 370/329
See application file for complete search history.

(56) References Cited

U.S. PATENT DOCUMENTS

2023/0354364 A1* 11/2023 Guo .................... H04W 72/232

FOREIGN PATENT DOCUMENTS

KR 20200143677 A * 12/2020 ............ H04W 72/21

OTHER PUBLICATIONS

ETSI MCC, "Report of 3GPP TSG RAN WG2 meeting #122, Incheon, Korea," 3GPP TSG-RAN WG2 meeting #123, Incheon, Korea, R2-2307001, May 22-26, 2023.
3GPP TS 38.321 V17.4.0 (Mar. 2023); Technical Specification; 3rd Generation Partnership Project; Technical Specification Group Radio Access Network; NR; Medium Access Control (MAC) protocol specification (Release 17).
3GPP TS 38.331 V17.4.0 (Mar. 2023); Technical Specification; 3rd Generation Partnership Project; Technical Specification Group Radio Access Network; NR; Radio Resource Control (RRC) protocol specification (Release 17).

(Continued)

*Primary Examiner* — Sibte H Bukhari
(74) *Attorney, Agent, or Firm* — Nicholas Park

(57) ABSTRACT

A Method and Apparatus for discontinuous reception and discontinuous transmission are provided. The method includes receiving a radio resource control (RRC) reconfiguration message, receiving a specific downlink control information, activating cell discontinuous transmission (DTX) for a specific serving cell based on the specific downlink control information, performing physical downlink control channel (PDCCH) monitoring for the specific serving cell based on whether a cell-dtx-timer of the specific serving cell is running, triggering a Scheduling Request (SR) for beam failure recovery, transmitting the SR, performing PDCCH monitoring for the specific serving cell regardless of whether the cell-dtx-timer of the specific serving cell is running, transmitting a MAC CE comprising beam failure related information, and canceling the SR triggered for beam failure recovery.

12 Claims, 8 Drawing Sheets

(56) References Cited

OTHER PUBLICATIONS

3GPP TS 38.213 V17.5.0 (Mar. 2023); Technical Specification; 3rd Generation Partnership Project; Technical Specification Group Radio Access Network; NR; Physical layer procedures for control (Release 17).

3GPP TS 38.212 V17.5.0 (Mar. 2023); Technical Specification; 3rd Generation Partnership Project; Technical Specification Group Radio Access Network; NR; Multiplexing and channel coding (Release 17).

* cited by examiner

User Plane Protocol Stack

Control Plane Protocol Stack

METHOD AND APPARATUS FOR DISCONTINUOUS RECEPTION IN WIRELESS MOBILE COMMUNICATION SYSTEM

CROSS-REFERENCE TO RELATED APPLICATION

This application claims priority to and the benefit of Korean Patent Application No. 10-2023-0082415, filed on Jun. 27, 2023, the disclosure of which is incorporated herein by reference in its entirety.

BACKGROUND

Technical Field

The present disclosure relates to discontinuous reception and discontinuous transmission in wireless mobile communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Network energy saving is one of hot topic in 5G communication system. By turning off the transmitter during cell specific non active time, GNB energy consumption can be reduced. Since a UE can be configured with multiple serving cells, this may incur excessive UE complexity in managing DRX operation of each and every cell.

SUMMARY

Aspects of the present disclosure are to address discontinuous reception and discontinuous transmission. The method includes receiving a radio resource control (RRC) reconfiguration message, receiving a specific downlink control information, activating cell discontinuous transmission (DTX) for a specific serving cell based on the specific downlink control information, performing physical downlink control channel (PDCCH) monitoring for the specific serving cell based on whether a cell-dtx-timer of the specific serving cell is running, triggering a Scheduling Request (SR) for beam failure recovery, transmitting the SR, per forming PDCCH monitoring for the specific serving cell regardless of whether the cell-dtx-timer of the specific serving cell is running, transmitting a MAC CE comprising beam failure related information, and canceling the SR triggered for beam failure recovery.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Figure 1A:
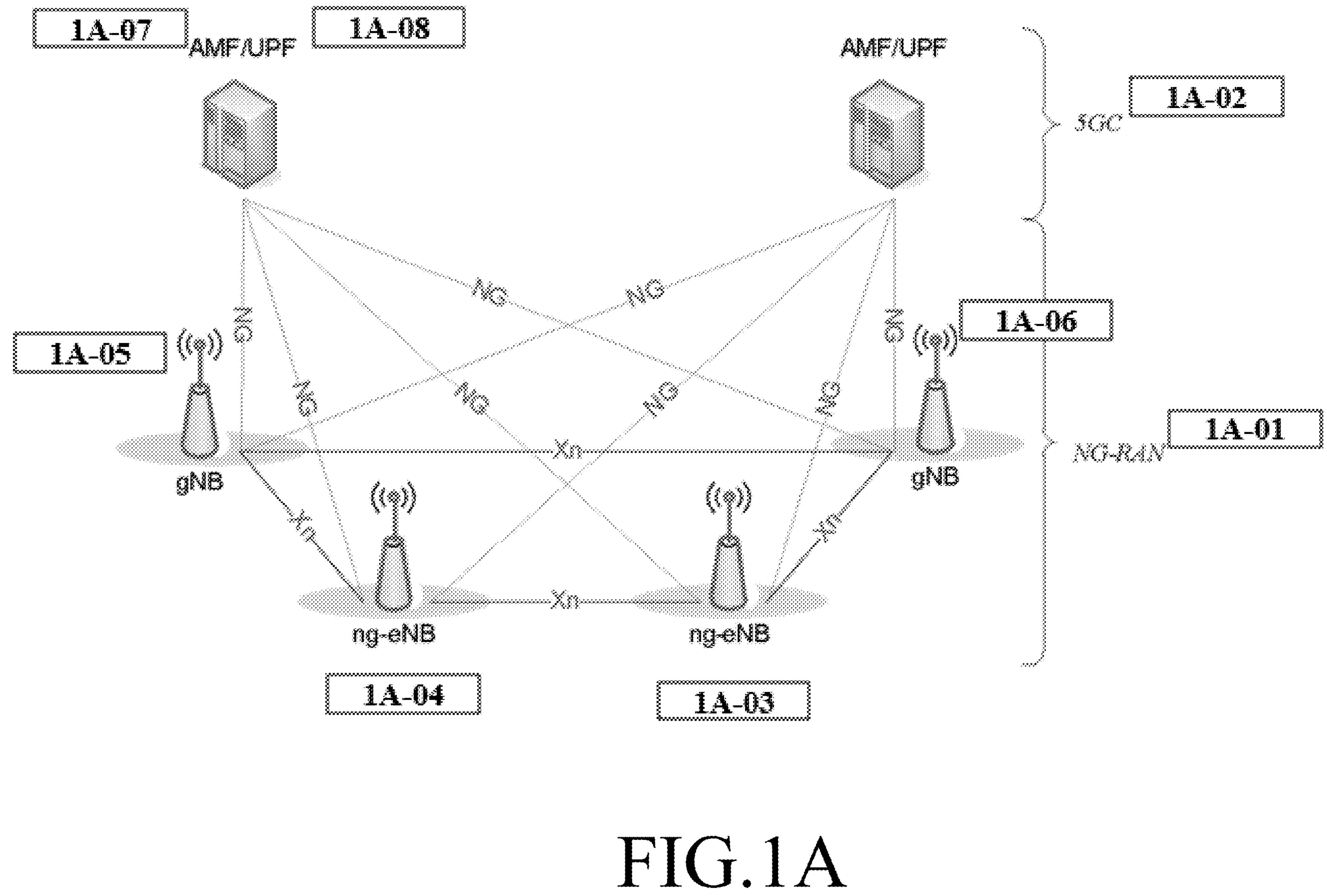
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

- Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
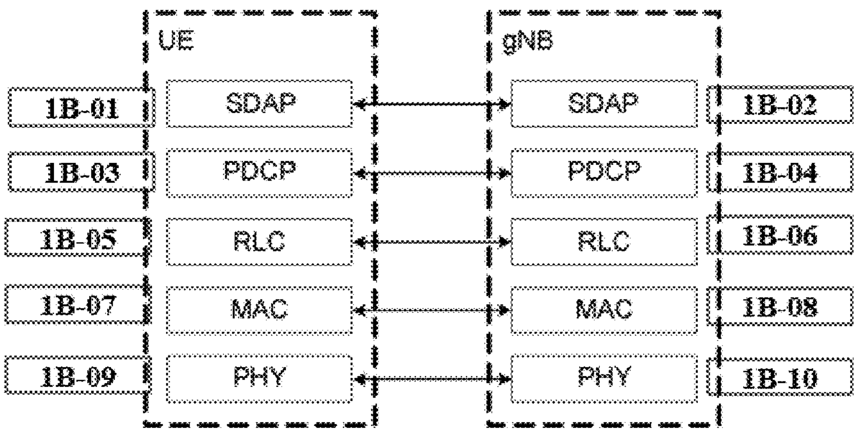
FIG. 1B is a diagram illustrating a wireless protocol architecture in an 5G system to which the disclosure may be applied.
Figure 1B:
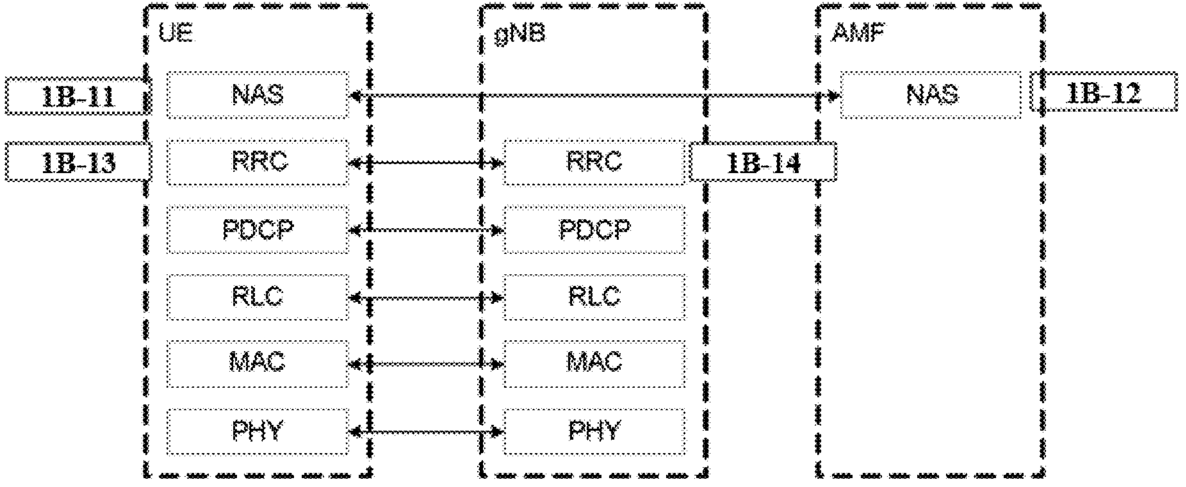

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc.

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/de multiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

An IE in a field may contain one or more child fields and child IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/up stream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

In this invention, XXX_XXX denotes an IE. xxx_xxx denotes a field. xxx_XXX denotes a variable. XXX_xxx denotes a value indicated in xxx_xxx field. X denotes an upper character. x denotes an lower character.

L3-XXX-XXX means Layer 3 control message of XXX-XXX. L2-XXX-XXX means Layer 2 control message (or MAC CE) of XXX-XXX. L1-DCI-N-M means Layer 1 D CI format N_M.

In this invention, a method to reduce network energy consumption is introduced. GNB can configure cell specific active time. By turning off the transmitter during cell specific non active time, GNB energy consumption can be reduced. By turning off the receiver during cell specific non active time, GNB energy consumption can be reduced.

At the same time, to avoid excessive UE complexity in managing DRX operation of each and every cell, cell specific active time is consolidated into DRX group specific active time.

In this invention, a cell can be configured with CELL-DTX and/or CELL-DRX. If CELL-DTX is activated, GNB transmits limited set of downlink signals during a certain time period. If CELL-DRX is activated, GNB receives limited set of uplink signals during a certain time period.

UE transmits and receives according to CELL-DTX and CELL-DRX.

cell-dtx is a state of cell where limited set of downlink signals are transmitted by abase station in the cell during a specific time period. UE is informed if a cell is in cell-dtx or not from a specific downlink signal.

cell-drx is a state of cell where limited set of uplink signals are monitored/received by a base station in the cell during a specific time period. UE is informed if a cell is in cell-drx or not from a specific downlink signal.

That cell-dtx is configured for a cell means:

1: the cell is expected to operate based on set of parameters on cell-dtx when cell-dtx is activated for the cell;

1: UE is provided with the set of parameters on cell-dtx for the cell. The set of parameters can be applied for the operation in the cell depending on whether cell-dtx is activated or not.

That cell-dtx is activated for a cell means:

1: the cell is expected to operate based on set of parameters on cell-dtx;

1: UE performs PDCCH monitoring based on the set of parameters on cell-dtx;

1: UE is informed via a specific downlink signal that cell-dtx is activated for the cell.

That cell-drx is configured for a cell means:

1: the cell is expected to operate based on set of parameters on cell-drx when cell-drx is activated for the cell;

1: UE is provided with the set of parameters on cell-drx for the cell. The set of parameters can be applied for the operation in the cell depending on whether cell-drx is activated or not.

That cell-drx is activated for a cell means:

1: the cell is expected to operate based on set of parameters on cell-drx;

1: UE performs PDCCH monitoring based on the set of parameters on cell-drx;

1: UE is informed via a specific downlink signal that cell-drx is activated for the cell.

Figure 1C:
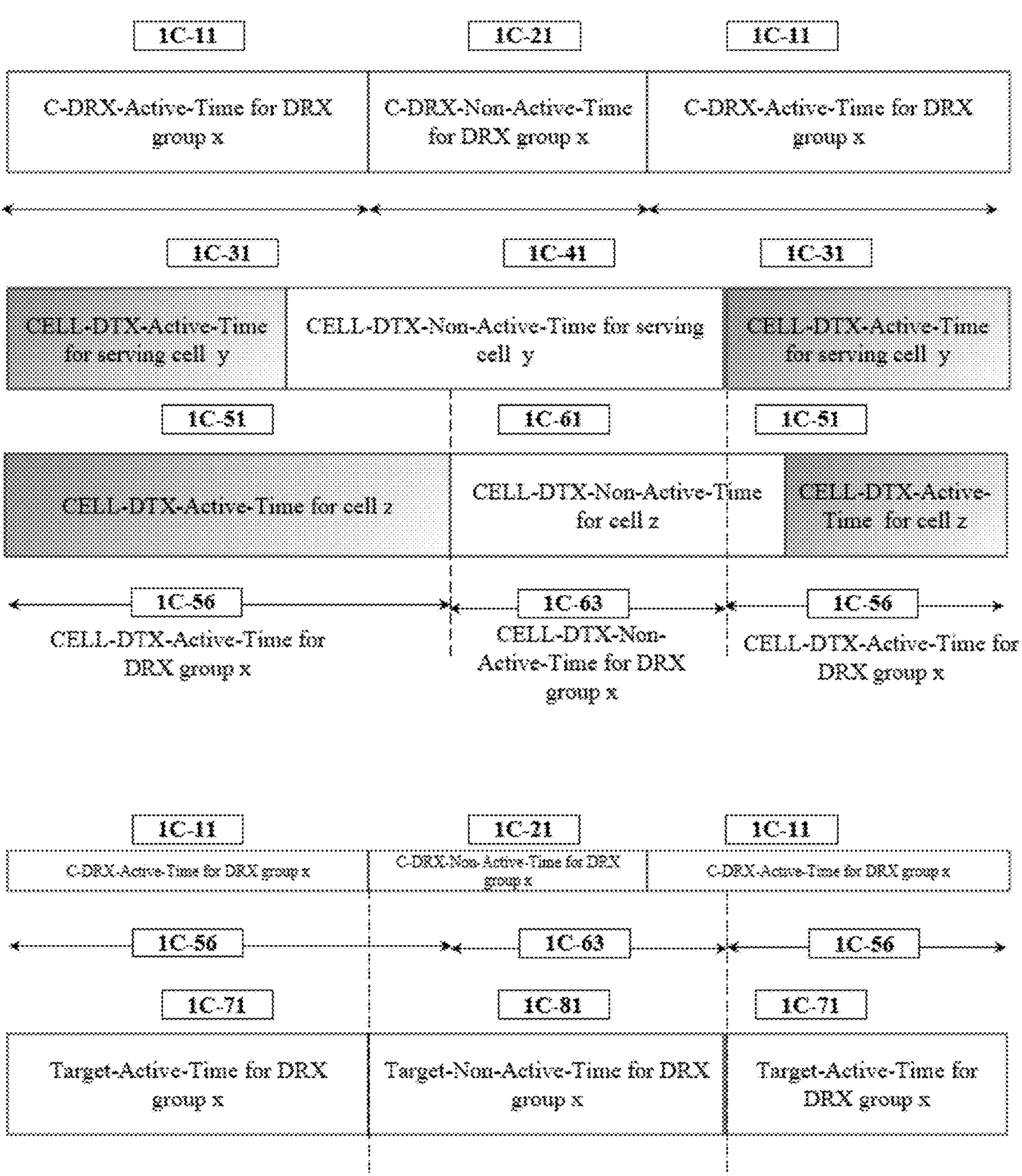
FIG. 1C is a diagram illustrating DRX operation between UE and GNB.

FIG. 1C illustrates DRX operation between the UE and the GNB.

UE monitors dci-set-active-time for a DRX group during:

1: C-DRX-Active-Time of the DRX group 1C-11;

2: if C-DRX is configured for the DRX group and CELL-DTX is not configured in any serving cell of the DRX group; or 2: if C-DRX is configured for the DRX group and CELL-DTX is configured in at least one serving cell of the DRX group and CELL-DTX is not activated in any serving cell of the DRX group;

1: CELL-DTX-Active-Time of the DRX group 1C-56;

2: if C-DRX is not configured for the DRX group and CELL-DTX is configured in any serving cell of the DRX group and CELL-DTX is activated in any serving cell of the DRX group;

2: CELL-DTX-Active-Time of the DRX group is union of CELL-DTX-Active-Time of cell y(1C-31) and CELL-DTX-Active-Time of cell z 1C-51 (i.e. It is CELL-DTX-Active-Time of a DRX group if at least one serving cell of the DRX group is in CELL-DT X-Active-Time);

1: Target-Active-Time of the DRX group 1C-71;

2: if C-DRX is configured for the DRX group and CELL-DTX is configured in at least one serving cell of the DRX group and CELL-DTX is activated in at least one serving cell of the DRX group;

2: Target-Active-Time of the DRX group is intersection of A and B

3: A is C-DRX-Active-Time of the DRX group;

3: B is union of CELL-DTX-Active-Times of serving cells of the DRX group (or B is CELL-DTX-Active-Time of the DRX group).

UE monitors dci-set-non-active-time for a DRX group during:

1: C-DRX-Non-Active-Time of the DRX group 1C-21;

2: if C-DRX is configured for the DRX group and CELL-DTX is not configured in any serving cell of the DRX group; or 2: if C-DRX is configured for the DRX group and CELL-DTX is configured in at least one serving cell of the DRX group and CELL-DTX is not activated in at least one serving cell of the DRX group;

1: CELL-DTX-Non-Active-Time of the DRX group;

2: if C-DRX is not configured for the DRX group and CELL-DTX is configured in at least one serving cell of the DRX group and CELL-DTX is activated in at least one serving cell of the DRX group;

2: CELL-DTX-Non-Active-Time of the DRX group is intersection of CELL-DT X-Non-Active-Time of cell y 1C-41 and CELL-DTX-Non-Active-Time of cell z 1C-61 (i.e. It is CELL-DTX-Non-Active-Time of a DRX group if all the serving cells of the DRX group is in CELL-DTX-Non-Active-Time);

1: Target-Non-Active-Time of the DRX group 1C-81;

2: if C-DRX is configured for the DRX group and CELL-DTX is configured in at least one serving cell of the DRX group and CELL-DTX is activated in at least one serving cell of the DRX group;

2: Target-Non-Active-Time of the DRX group is intersection of C and D;

3: C is C-DRX-Non-Active-Time of the DRX group;

3: D is intersection of CELL-DTX-Non-Active-Times of serving cells of the DRX group (or D is CELL-DTX-Non-Active-Time of the DRX group).

dci-set-active-time includes DCI format 0_0, DCI format 0_1, DCI format 0_2, DCI format 1_0, DCI format 1_1, DCI format 1_2 and DCI format 2_8.

DCI format 0_0 is used for the scheduling of PUSCH in one cell. It includes Frequency domain resource assignment, Time domain resource assignment, Modulation and coding scheme, New data indicator, HARQ process number, UL/SUL indicator etc.

DCI format 0_1 is used for the scheduling of one or multiple PUSCH in one cell. It includes Carrier indicator, Bandwidth part indicator, Frequency domain resource assignment, Time domain resource assignment, Modulation and coding scheme, New data indicator, HARQ process number, Precoding information and number of layers, Antenna ports, SRS request, CSI request, UL/SUL indicator etc.

DCI format 0_2 is used for the scheduling of PUSCH in one cell. It includes It includes Carrier indicator, Bandwidth part indicator, Frequency domain resource assignment, Time domain resource assignment, Modulation and coding scheme, New data indicator, HARQ process number, Precoding information and number of layers, Antenna ports, SRS request, CSI request, UL/SUL indicator etc.

DCI format 1_0 is used for the scheduling of PDSCH in one DL cell. It includes Frequency domain resource assignment, Time domain resource assignment, Modulation and coding scheme, New data indicator, HARQ process number, PUCCH resource indicator etc.

DCI format 1_1 is used for the scheduling of one or multiple PDSCH in one cell. It includes Carrier indicator, Bandwidth part indicator, Frequency domain resource assignment, Time domain resource assignment, Modulation and coding scheme for transport block 1, New data indicator for transport block 1, Modulation and coding scheme for transport block 2, New data indicator for transport block 2, HARQ process number, Precoding information and number of layers, PUCCH resource indicator, Antenna ports, SRS request etc.

DCI format 1_2 is used for the scheduling of PDSCH in one cell. It includes Carrier indicator, Bandwidth part indicator, Frequency domain resource assignment, Time domain resource assignment, Modulation and coding scheme, New data indicator, HARQ process number, Transmission configuration indication, Precoding information and number of lay ers, PUCCH resource indicator, Antenna ports, SRS request etc.

DCI format 2_8 is used for notifying network power saving information for a one cell for one or more UEs. DCI format 2_8 indicates at least whether cell-level-dtx is activated or deactivated. UE starts and stops cell-dtx-onduration-timer and Cell-dtx-offduration-timer of a second cell for which cell-level-dtx is activated and not deactivated. DCI format 2_8 can indicate whether cell-level-drx is activated or deactivated. UE starts and stops cell-drx-onduration-timer of a second cell for which cell-level-dtx is activated and not deactivated.

dci-set-non-active-time includes DCI_format 2_8.

Target-Active-Time for a DRX group occurs when it is C-DRX-Active-Time for the DRX group and at least one serving cell of the DRX group is in CELL-DTX-Active-Tim e.

UE consider the following case as CELL-DTX-Active-Time of a serving cell x;

1: CELL-DTX is not configured for the serving cell x (in this case, cell-dtx-onduration-timer is considered always running for the serving cell x); or
1: CELL-DTX is configured and;
  2: not activated for the serving cell x (i.e. cell-dtx-onduration-timer is considered always running for the serving cell x); or
  2: activated for the serving cell x and cell-dtx-onduration-timer is currently running for the serving cell x; or
  2: activated for the serving cell x and Cell-dtx-offduration-timer is currently not running for the serving cell x.

When C-DRX is configured for a DRX group and CELL-DTX is not configured in any serving cell of the DRX group, the C-DRX-Active-Time for the DRX group (or for the Serving Cells in the DRX group) includes the time while:

1: drx-onDurationTimer or drx-InactivityTimer configured for the DRX group is running; or
1: ra-ContentionResolutionTimer or msgB-ResponseWindow is running and the DRX group is primary DRX group; or
1: drx-RetransmissionTimerDL, drx-RetransmissionTimerUL or drx-RetransmissionTimerSL is running on any Serving Cell in the DRX group; or
1: a PDCCH indicating a new transmission addressed to the C-RNTI of the MAC entity has not been received after successful reception of a Random Access Response for the Random Access Preamble not selected by the MAC entity among the contention-based Random Access Preamble.

the C-DRX-Non-Active-Time for the DRX group is the time that is not C-DRX-Active-Time.

When C-DRX is not configured for a DRX group, CELL-DTX is configured in at 1 east one serving cell of the DRX group and CELL-DTX is activated in at least one serving cell of the DRX group, the CELL-DTX-Active-Time for the DRX group (or for the Serving Cells in the DRX group) includes the time while:

1: cell-dtx-onduration-timer of at least one serving cell of the DRX group is running. CELL-DTX-Non-Active-Time for the DRX group is the time that is not CELL-DT X-Non-Active-Time. It includes the time while:
1: cell-dtx-onduration-timer of no serving cell of the DRX group is running; or
1: CELL_DTX_offDurationTimer of the DRX group's all serving cells where CE LL-DTX is activated is running.

When C-DRX is configured for a DRX group, CELL-DTX is configured in at least one serving cell of the DRX group and CELL-DTX is activated in at least one serving cell of the DRX group, the Target-Active-Time for the DRX group (or for the Serving Cells in the DRX group) includes the time while:

1: drx-onDurationTimer configured for the DRX group and cell-dtx-onduration-timer of at least one serving cell of the DRX group is running; or
1: drx-InactivityTimer configured for the DRX group and cell-dtx-onduration-timer of at least one serving cell of the DRX group is running; or
1: Scheduling Request is sent on PUCCH and is pending and Cell-dtx-onduration-timer of at least one serving cell of the DRX group is running; or
1: drx-RetransmissionTimerDL, drx-RetransmissionTimerUL or drx-RetransmissionTimerSL is running on any Serving Cell in the DRX group; or
1: ra-ContentionResolutionTimer or msgB-ResponseWindow is running and the DRX group is primary DRX group;
1: a PDCCH indicating a new transmission addressed to the C-RNTI of the MAC entity has not been received after successful reception of a Random Access Response for the Random Access Preamble not selected by the MAC entity among the contention-based Random Access Preamble.

The Target-Non-Active-Time for the DRX group (or for the Serving Cells in the DRX group) is the time that is not Target-Active-Time for the DRX group.

UE manages various timers for DRX operation. DRX related timers can be categorized as follows.

1: UE-specific-timer:
  2: is a timer configured for a DRX group of a UE. A single instance of timer value for a DRX group is configured for a DRX group;
  2: drx-onDurationTimer, drx-InactivityTimer, drx-RetransmissionTimerDL, drx-RetransmissionTimerUL, drx-RetransmissionTimerSL.
1: Group-common-timer:
  2: is a timer configured for a one or more UEs in a serving cell. A single instance of initial timer value is configured for the serving cell.
  2: cell-dtx-onduration-timer, Cell-dtx-offduration-timer.
1: Stand-alone-timer
  2: is a timer that enable PDCCH monitoring by itself (i.e., UE monitors PDCCH when a stand-alone-timer is running).
  2: drx-RetransmissionTimerDL, drx-RetransmissionTimerUL and drx-RetransmissionTimerSL of the DRX group.
  2: ra-ContentionResolutionTimer and msgB-ResponseWindow of a specific serving cell (PCell).
1: UE-specific-non-stand-alone-timer:
  2: is a timer that enable PDCCH monitoring with a Group-common-non-stand-a lone-timer (i.e. UE monitors PDCCH when a UE-specific-non-stand-alone-timer and a Group-common-non-stand-alone-timer are running).
  2: drx-onDurationTimer and drx-InactivityTimer of the DRX group.
1: Group-common-non-stand-alone-timer:
  2: is a timer that enable PDCCH monitoring with a UE-specific-non-stand-alone-timer (i.e. UE monitors PDCCH when a UE-specific-non-stand-alone-timer and a Group-common-non-stand-alone-timer are running).
  2: cell-dtx-onduration-timers of serving cells of the DRX group.

UE performs followings for DRX related timers.

UE starts drx-HARQ-RTT-TimerDL for a HARQ process upon following events:

1: a MAC PDU is received in a configured downlink assignment for the HARQ process; or 1: a PDCCH is received and the PDCCH indicates a DL transmission for the HARQ process.

UE starts drx-HARQ-RTT-TimerUL for a HARQ process upon following events:

1: a MAC PDU is transmitted in a configured uplink grant for the HARQ process; or 1: a PDCCH is received and the PDCCH indicates a UL transmission for the HARQ process.

Once started, drx-HARQ-RTT-TimerDL (and drx-HARQ-RTT-TimerUL) runs until expiry.

UE starts drx-RetransmissionTimerDL for a HARQ process upon following event:

1: drx-HARQ-RTT-TimerDL for the HARQ process expires; and

1: the data of the corresponding HARQ process was not successfully decoded.

UE stops drx-RetransmissionTimerDL for a HARQ process upon following event:

1: a MAC PDU is received in a configured downlink assignment for the HARQ process; or 1: a PDCCH is received and the PDCCH indicates a DL transmission for the HARQ process.

UE starts drx-RetransmissionTimerUL for a HARQ process upon following events:

1: a drx-HARQ-RTT-TimerUL for the HARQ process expires.

UE stops drx-RetransmissionTimerUL for a HARQ process upon following events:

1: a MAC PDU is transmitted in a configured uplink grant for the HARQ process; or 1: a PDCCH is received and the PDCCH indicates a UL transmission for the HARQ process.

If cell_dtx_onDurationTimer is indicated for a third serving cell of this DRX group, UE starts:

1: cell-dtx-onduration-timer for the third serving cell of this DRX group after cell-dtx-SlotOffset from the beginning of a subframe fulfilling [(SFN×10)+subframe number] modulo (CELL_dtx_Cycle)=CELL-_dtx_StartOffset.

1: Cell-dtx-offduration-timer for the third serving cell of this DRX group at the next slot where the cell-dtx-onduration-timer expires.

If cell_dtx_offDurationTimer is indicated for the third serving cell of this DRX group, UE starts:

1: cell-dtx-offduration-timer for the third serving cell of this DRX group after cell-dtx-SlotOffset from the beginning of a subframe fulfilling [(SFN×10)+subframe number] modulo (cell-dtx-Cycle)=CELL-_dtx_slot_offset.

1: cell-dtx-onduration-timer for the third serving cell os this DRX group at the next slot where the cell-dtx-onduration-timer expires.

The third serving cell is activated serving cell for which CELL-DTX is configured and activated.

If CELL-DRX is configured for a fourth serving cell of this DRX group, UE starts:

1: cell-drx-onduration-timer for the fourth serving cell of this DRX group after cell-drx-SlotOffset from the beginning of a subframe fulfilling [(SFN×10)+subframe number] modulo (cell-drx-Cycle)=CELL-_drx_StartOffset.

1: Cell-drx-offduration-timer for the third serving cell of this DRX group at the next slot where the cell-drx-onduration-timer expires.

UE starts drx-onDurationTimer for this DRX group after drx-SlotOffset from the beginning of a subframe fulfilling [(SFN×10)+subframe number] modulo (drx-LongCycle) =drx-StartOffset.

UE stops drx-onDurationTimer for this DRX group upon following events:

1: DRX Command MAC CE is received; or

1: Long DRX Command MAC CE is received.

UE starts drx-InactivityTimer for this DRX group upon following events:

1: a PDCCH is received and the PDCCH indicates a new transmission (DL, UL or

SL) on a Serving Cell in this DRX group.

UE stops drx-InactivityTimer for this DRX group upon following events:

1: DRX Command MAC CE is received; or

1: Long DRX Command MAC CE is received.

Figure 2A:
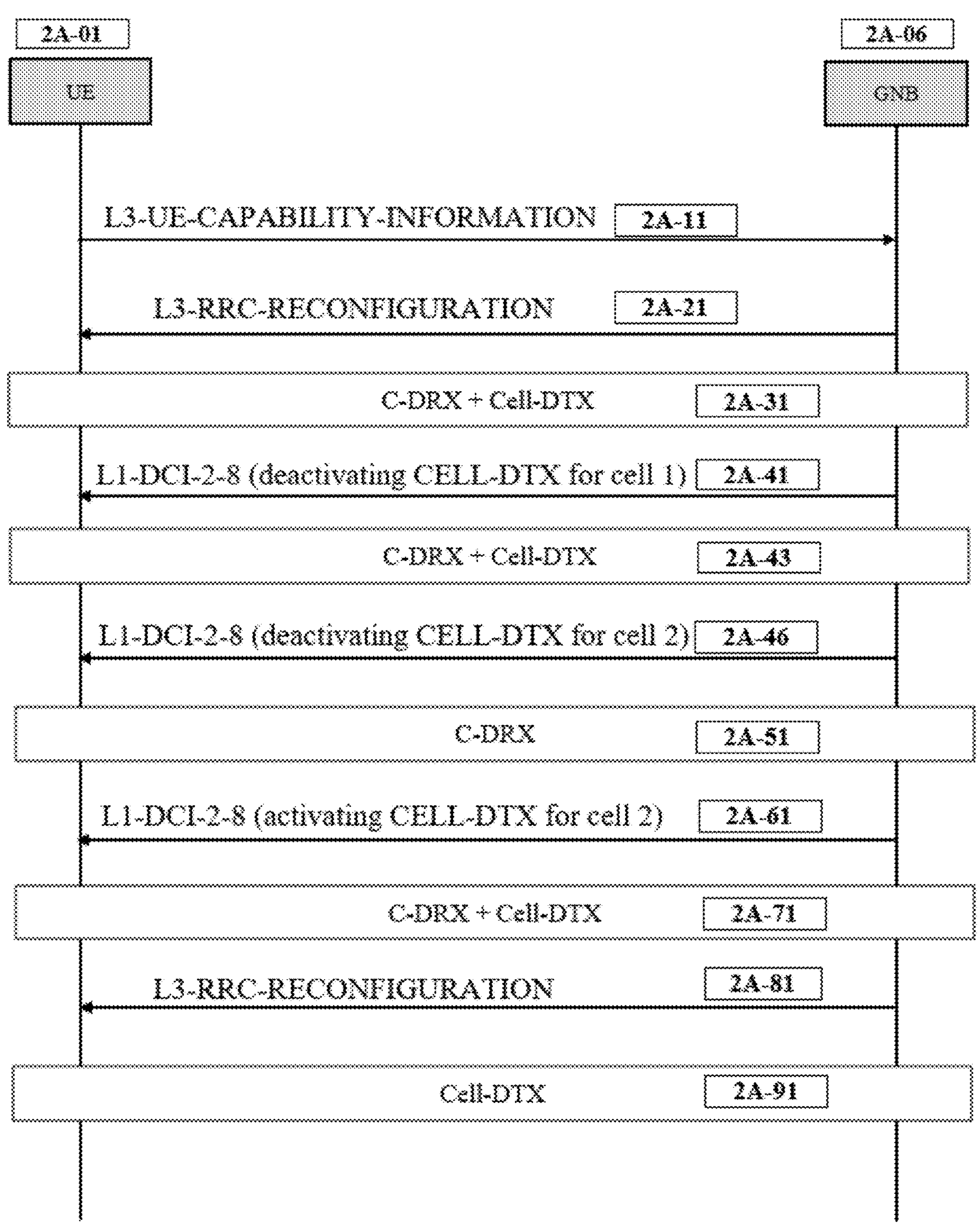
FIG. 2A is a diagram illustrating operations of a terminal and a base station according to an embodiment of the present invention.

FIG. 2A illustrates the operation of the UE and the base station for network energy saving.

UE 2A-01 and GNB 2A-06 performs downlink reception in a one or more serving cells.

UE transmits to GNB a L3-UE-CAPABILITY-INFORMATION in PCell 2A-11.

The L3-UE-CAPABILITY-INFORMATION includes various capability information.

Based on reported capability information and other considerations (such as amount of traffic of the UE, cell load and channel condition), GNB may decides to configure the UE with carrier aggregation and DRX. In addition, if the serving cells of the UE is capable of network energy saving features, GNB may provide network energy saving feature related parameters for each serving cell.

GNB transmits a L3-RRC-RECONFIGURATION to the UE 2A-21.

The L3-RRC-RECONFIGURATION configured UE followings:

1: Carrier Aggregation with one or more SCells;

1: a C-DRX for a primary DRX group;

1: a C-DRX for a secondary DRX group;

1: CELL-DTX for one or more serving cells;

1: CELL-DRX for one or more serving cells.

The L3-RRC-RECONFIGURATION may indicate activation of CELL-DTX of one or more serving cells. The L3-RRC-RECONFIGURATION may indicate activation of CELL-DRX of one or more serving cells.

The L3-RRC-RECONFIGURATION includes the configuration parameters determined based on reported capability information and other considerations.

The L3-RRC-RECONFIGURATION includes:

1: a single instance of DRX_CONFIGURATION;

2: this IE provides DRX parameters for the primary DRX group;

2: this IE provides part of DRX parameters for the secondary DRX group;

1: a single instance of DRX-ConfigSecondaryGroup;

2: this IE provides remaining DRX parameters for the secondary DRX group;

1: one or more instances of ServingCellConfigCommon;

2: Each ServingCellConfigCommon includes;

3: zero or one instance of CELL_DTX_CONFIGURATION;

3: zero or one instance of cell_dtx_activation_indication;

4: cell_dtx_activation_indication is enumerated with a single value. If this field is present, CELL-DTX of the corresponding serving cell is activated. If this field is absent, CELL-DTX of the corresponding serving cell is deactivated.

3: zero or one instance of CELL_DRX_CONFIGURATION;

3: a same_configuration_applied to indicate whether CELL-DTX and CELL-DRX are configured based on the same configuration;

1: one or more instances of PUCCH_CONFIGURATIONs;

2: each PUCCH_CONFIGURATION is associated with an uplink BWP of PCell and includes;

3: one or more PUCCH_RESORUCE;

4: each PUCCH_RESOURCE indicates the frequency resource of PUCCH;

4: each PUCCH_RESOURCE includes a starting_prb indicating the PRB with which the PUCCH resource is associated;

3: zero or more SCHEDULING_REQUEST_RESOURCE_CONFIGURATION;

4: each SCHEDULING_REQUEST_RESOURCE_CONFIGURATION provides time/frequency resource information for scheduling request 4: each SCHEDULING_REQUEST_RESOURCE_CONFIGURATION includes;

5: periodicityAndOffset indicating the time resource;

5: PUCCH_RESOURCE_ID indicating the frequency resource.

UE determines, for each serving cell, whether CELL-DTX and CELL-DRX is configured as below.

UE shall:

1: in a ServingCellConfigCommon of a serving cell;

2: if same_configuration_applied is absent and CELL_DTX_CONFIGURATION is present and CELL_DRX_CONFIGURATION is present;

3: consider CELL-DTX is configured based on CELL_DTX_CONFIGURATION; and

3: consider CELL-DRX is configured based on CELL_DRX_CONFIGURATION;

2: else if same_configuration_applied is present and CELL_DTX_CONFIGURATION is present and CELL_DRX_CONFIGURATION is absent;

3: consider CELL-DTX is configured based on CELL_DTX_CONFIGURATION; and

3: consider CELL-DRX is configured based on CELL_DTX_CONFIGURATION;

2: if same_configuration_applied is absent and CELL_DTX_CONFIGURATION is present and CELL_DRX_CONFIGURATION is absent;

3: consider CELL-DTX is configured based on CELL_DTX_CONFIGURATION; and

3: consider CELL-DRX is not configured;

2: if same_configuration_applied is absent and CELL_DTX_CONFIGURATION is absent and CELL_DRX_CONFIGURATION is present;

3: consider CELL-DTX is not configured; and

3: consider CELL-DRX is configured based on CELL_DRX_CONFIGURATION.

The IE DRX_CONFIGURATIONURATION is used to configure C-DRX related parameters. A single instance of DRX_CONFIGURATIONURATION is provided to the UE.

The IE within the DRX_CONFIGURATIONURATION is applied to all serving cells of the UE.

```
DRX_CONFIGURATION ::= SEQUENCE {
drx-onDurationTimer CHOICE {
subMilliSeconds INTEGER (1..31),
milliSeconds ENUMERATED {ms1, ms2, ms3, ms4, ms5, ms6, ms8, ms10, ms20,
ms30, ms40, ms50, ms60, ms80, ms100, ms200, ms300, ms400, ms500, ms600, ms800,
ms1000, ms1200, ms1600, spare8, spare7, spare6, spare5, spare4, spare3, spare2, spare1 }
},
drx-InactivityTimer ENUMERATED {ms0, ms1, ms2, ms3, ms4, ms5, ms6, ms8,
ms10, ms20, ms30, ms40, ms50, ms60, ms80, ms100, ms200, ms300, ms500, ms750,
ms1280, ms1920, ms2560, spare9, spare8, spare7, spare6, spare5, spare4, spare3, spare2,
spare1},
drx-HARQ-RTT-TimerDL INTEGER (0..56),
drx-HARQ-RTT-TimerUL INTEGER (0..56),
drx-RetransmissionTimerDL ENUMERATED { sl0, sl1, sl2, sl4, sl6, sl8, sl16, sl24,
sl33, sl40, sl64, sl80, sl96, sl112, sl128, sl160, sl320, spare15, spare14, spare13, spare12,
spare11, spare10, spare9, spare8, spare7, spare6, spare5, spare4, spare3, spare2, spare1},
drx-RetransmissionTimerUL ENUMERATED { sl0, sl1, sl2, sl4, sl6, sl8, sl16, sl24,
sl33, sl40, sl64, sl80, sl96, sl112, sl128, sl160, sl320, spare15, spare14, spare13, spare12,
spare11, spare10, spare9, spare8, spare7, spare6, spare5, spare4, spare3, spare2, spare1 },
drx-LongCycleStartOffset CHOICE {
ms10 INTEGER(0..9),
ms20 INTEGER(0..19),
ms32 INTEGER(0..31),
ms40 INTEGER(0..39),
ms60 INTEGER(0..59),
ms64 INTEGER(0..63),
ms70 INTEGER(0..69),
ms80 INTEGER(0..79),
ms128 INTEGER(0..127),
ms160 INTEGER(0..159),
ms256 INTEGER(0..255),
ms320 INTEGER(0..319),
ms512 INTEGER(0..511),
ms640 INTEGER(0..639),
ms1024 INTEGER(0..1023),
ms1280 INTEGER(0..1279),
ms2048 INTEGER(0..2047),
ms2560 INTEGER(0..2559),
```

-continued

```
ms5120 INTEGER(0..5119),
ms10240 INTEGER(0..10239)
},
shortDRX SEQUENCE {
drx-ShortCycle ENUMERATED { ms2, ms3, ms4, ms5, ms6, ms7, ms8, ms10, ms14,
ms16, ms20, ms30, ms32, ms35, ms40, ms64, ms80, ms128, ms160, ms256, ms320,
ms512, ms640, spare9, spare8, spare7, spare6, spare5, spare4, spare3, spare2, spare1 },
drx-ShortCycleTimer INTEGER (1..16)
} OPTIONAL, -- Need R
drx-SlotOffset INTEGER (0..31)
}
```

drx-HARQ-RTT-TimerDL: Value in number of symbols of the BWP where the transport block was received.

drx-HARQ-RTT-TimerUL: Value in number of symbols of the BWP where the transport block was transmitted.

drx-InactivityTimer: Value in multiple integers of 1 ms. ms0 corresponds to 0, ms1 corresponds to 1 ms, ms2 corresponds to 2 ms, and so on.

drx-LongCycleStartOffset: drx-LongCycle in ms and drx-StartOffset in multiples of 1 ms. If drx-ShortCycle is configured, the value of drx-LongCycle shall be a multiple of the drx-ShortCycle value.

drx-onDurationTimer: Value in multiples of 1/32 ms (subMilliSeconds) or in ms (milliSecond). For the latter, value ms1 corresponds to 1 ms, value ms2 corresponds to 2 ms, and so on.

drx-RetransmissionTimerDL: Value in number of slot lengths of the BWP where the transport block was received. value s10 corresponds to 0 slots, s11 corresponds to 1 slot, s12 corresponds to 2 slots, and so on.

drx-RetransmissionTimerUL: Value in number of slot lengths of the BWP where the transport block was transmitted. s10 corresponds to 0 slots, s11 corresponds to 1 slot, s12 corresponds to 2 slots, and so on.

drx-ShortCycleTimer: Value in multiples of drx-ShortCycle. A value of 1 corresponds to drx-ShortCycle, a value of 2 corresponds to 2*drx-ShortCycle and so on.

drx-ShortCycle: Value in ms. ms1 corresponds to 1 ms, ms2 corresponds to 2 ms, and so on.

drx-SlotOffset: Value in 1/32 ms. Value 0 corresponds to 0 ms, value 1 corresponds to 1/32 ms, value 2 corresponds to 2/32 ms, and so on.

The IE DRX-ConfigSecondaryGroup is used to configure DRX related parameters for the second DRX group.

```
DRX-ConfigSecondaryGroup-r16 ::= SEQUENCE {
drx-onDurationTimer CHOICE {
subMilliSeconds INTEGER (1..31),
milliSeconds ENUMERATED {ms1, ms2, ms3, ms4, ms5, ms6, ms8, ms10, ms20,
ms30, ms40, ms50, ms60, ms80, ms100, ms200, ms300, ms400, ms500, ms600, ms800,
ms1000, ms1200, ms1600, spare8, spare7, spare6, spare5, spare4, spare3, spare2, spare1 }
},
drx-InactivityTimer ENUMERATED {ms0, ms1, ms2, ms3, ms4, ms5, ms6, ms8,
ms10, ms20, ms30, ms40, ms50, ms60, ms80, ms100, ms200, ms300, ms500, ms750,
ms1280, ms1920, ms2560, spare9, spare8, spare7, spare6, spare5, spare4, spare3, spare2,
spare1},
}
```

The IE CELL_DTX_CONFIGURATIONURATION is used to configure CELL-D TX related parameters. A single instance of CELL_DTX_CONFIGURATIONURATION per serving cell is provided to the UE. The IE within the CELL_DTX_CONFIGURATIONURATION is applied to the specific serving cell of the UE when the serving cell is activated and when CELL-DTX is activated for the serving cell.

```
CELL_DTX_CONFIGURATION ::= SEQUENCE {
cell_dtx_timer          CHOICE {
cell_dtx_onDurationTimer     ENUMERATED {ms1, ms2, ms3, ms4,
ms5, ms6, ms8, ms10, ms20, ms30, ms40, ms50, ms60, ms80, ms100,
ms200, ms300, ms400, ms500, ms600, ms800, ms1000, ms1200, ms1600,
spare8, spare7, spare6, spare5, spare4, spare3, spare2, spare1 }
cell_dtx_offDurationTimer     ENUMERATED {ms1, ms2, ms3, ms4,
ms5, ms6, ms8, ms10, ms20, ms30, ms40, ms50, ms60, ms80, ms100,
ms200, ms300, ms400, ms500, ms600, ms800, ms1000, ms1200, ms1600,
spare8, spare7, spare6, spare5, spare4, spare3, spare2, spare1 }
},
cell_dtx_ CycleStartOffset CHOICE {
ms10 INTEGER(0..9),
ms20 INTEGER(0..19),
ms32 INTEGER(0..31),
ms40 INTEGER(0..39),
ms60 INTEGER(0..59),
ms64 INTEGER(0..63),
ms70 INTEGER(0..69),
ms80 INTEGER(0..79),
ms128 INTEGER(0..127),
ms160 INTEGER(0..159),
ms256 INTEGER(0..255),
ms320 INTEGER(0..319),
ms512 INTEGER(0..511),
ms640 INTEGER(0..639),
ms1024 INTEGER(0..1023),
ms1280 INTEGER(0..1279),
ms2048 INTEGER(0..2047),
ms2560 INTEGER(0..2559),
ms5120 INTEGER(0..5119),
ms10240 INTEGER(0..10239)
},
```

-continued

```
cell_dtx_slot_offset INTEGER (0..31)
}
```

cell_dtx_CycleStartOffset: cell-dtx-cycle in ms and cell-drx-StartOffset in multiples of 1 ms.

cell_dtx_timer: Value in ms (milliSecond). value ms1 corresponds to 1 ms, value ms2 corresponds to 2 ms, and so on. If cell_dtx_onDurationTimer is provided in this field, the starting slot of CELL-DTX-Active-Time is determined/calculated based on the parameters and the starting slot of CELL-DTX-Non-Active-Time is determined from the end point of CELL-DTX-Active-Time. If cell_dtx_offDuration-Timer is provided in this field, the starting slot of CELL-DTX-Non-Active-Time is determined/calculated based on the parameters and the starting slot of CELL-DTX-Active-Time is determined from the end point of CELL-DTX-Non-Active-Time.

cell_dtx_slot_offset: Value in 1/32 ms. Value 0 corresponds to 0 ms, value 1 corresponds to 1/32 ms, value 2 corresponds to 2/32 ms, and so on.

The IE CELL_DRX_CONFIGURATION is used to configure CELL-DRX related parameters. A single instance of CELL_DRX_CONFIGURATION per serving cell is provided to the UE. The IE within the CELL_DRX_CONFIGURATION is applied to the specific serving cell of the UE when the serving cell is activated and when CELL-DRX is activated.

At 2A-31, UE performs downlink reception with GNB based on the received L3-RRC-RECONFIGURATION.

If C-DRX is configured for a DRX group and CELL-DTX are configured and activated for at least one serving cell of the DRX group, UE monitors for second serving cells of the DRX group:

1: PDCCH for dci-set-active-time during Target-Active-Time; and

1: PDCCH for dci-set-non-active-time during Target-Non-Active-Time.

At 2A-41, UE receives from the GNB a L1-DCI-2-8. The L1-DCI-2-8 indicates de activation of CELL-DTX for a serving cell (cell 1) of a DRX group.

At 2A-43, UE performs downlink reception with GNB.

If C-DRX is configured for a DRX group and there is at least one serving cell of the DRX group where CELL-DTX is configured and activated, UE monitors for second serving cells of the DRX group:

1: PDCCH for dci-set-active-time during Target-Active-Time; and

1: PDCCH for dci-set-non-active-time during Target-Non-Active-Time.

```
CELL_DRX_CONFIGURATION ::= SEQUENCE {
cell_drx_timer            CHOICE {
cell_drx_onduration_timer      ENUMERATED {ms1, ms2, ms3, ms4, ms5,
ms6, ms8, ms10, ms20, ms30, ms40, ms50, ms60, ms80, ms100, ms200, ms300, ms400,
ms500, ms600, ms800, ms1000, ms1200, ms1600, spare8, spare7, spare6, spare5, spare4,
spare3, spare2, spare1 }
cell_drx_offduration_timer      ENUMERATED {ms1, ms2, ms3, ms4, ms5,
ms6, ms8, ms10, ms20, ms30, ms40, ms50, ms60, ms80, ms100, ms200, ms300, ms400,
ms500, ms600, ms800, ms1000, ms1200, ms1600, spare8, spare7, spare6, spare5, spare4,
spare3, spare2, spare1 }
},
cell_drx_ CycleStartOffset CHOICE {
ms10 INTEGER(0..9),
ms20 INTEGER(0..19),
ms32 INTEGER(0..31),
ms40 INTEGER(0..39),
ms60 INTEGER(0..59),
ms64 INTEGER(0..63),
ms70 INTEGER(0..69),
ms80 INTEGER(0..79),
ms128 INTEGER(0..127),
ms160 INTEGER(0..159),
ms256 INTEGER(0..255),
ms320 INTEGER(0..319),
ms512 INTEGER(0..511),
ms640 INTEGER(0..639),
ms1024 INTEGER(0..1023),
ms1280 INTEGER(0..1279),
ms2048 INTEGER(0..2047),
ms2560 INTEGER(0..2559),
ms5120 INTEGER(0..5119),
ms10240 INTEGER(0..10239)
},
cell_drx_slot_offset INTEGER (0..31)
}
```

cell_drx_CycleStartOffset: cell_drx-cycle in ms and cell-drx-StartOffset in multiples of 1 ms.

cell_drx_timer: Value in ms (milliSecond). value ms1 corresponds to 1 ms, value ms2 corresponds to 2 ms, and so on. If cell_drx_onduration_timer is provided in this field, the starting slot of CELL-DRX-Active-Time is determined/calculated based on the parameters and the starting slot of CELL-DRX-Non-Active-Time is determined from the end point of CELL-DRX-Active-Time. If cell_drx_offduration_timer is provided in this field, the starting slot of CELL-DRX-Non-Active-Time is determined/calculated based on the parameters and the starting slot of CELL-DRX- Active-Time is determined from the end point of CELL-DRX-Non-Active-Time.

cell_drx_slot_offset: Value in 1/32 ms. Value 0 corresponds to 0 ms, value 1 corresponds to 1/32 ms, value 2 corresponds to 2/32 ms, and so on.

At 2A-46, UE reives from the GNB a L1-DCI-2-8. The L1-DCI-2-8 indicates deactivation of CELL-DTX for a serving cell (cell 2) of a DRX group.

At 2A-51, UE performs downlink reception with GNB.

If C-DRX is configured for a DRX group and there is no serving cell of the DRX group where CELL-DTX is configured and activated, UE monitors for second serving cells of the DRX group:

1: PDCCH for dci-set-active-time during C-DRX-Active-Time; and

1: PDCCH for dci-set-non-active-time during C-DX-Non-Active-Time.

At 2A-61, UE reives from the GNB a L1-DCI-2-8. The L1-DCI-2-8 indicates activation of CELL-DTX for a serving cell (cell 1) of a DRX group.

At 2A-71, UE performs downlink reception with GNB.

If C-DRX is configured for a DRX group and CELL-DTX are configured and activated for at least one serving cell of the DRX group, UE monitors for second serving cells of the DRX group:

1: PDCCH for dci-set-active-time during Target-Active-Time; and

1: PDCCH for dci-set-non-active-time during Target-Non-Active-Time.

At 2A-81, UE receives a L3-RRC-RECONFIGURATION. The L3-RRC-RECONFIGURATION includes information instructing release of C-DRX for the DRX group.

At 2A-91, UE performs downlink reception with GNB.

If C-DRX is not configured for a DRX group and CELL-DTX are configured and activated for at least one serving cell of the DRX group, UE monitors for second serving cell of the DRX group:

1: PDCCH for dci-set-active-time when at least one serving cell is in CELL-DTX-Active-Time; and 1: PDCCH for dci-set-non-active-time when all serving cells are in CELL-DTX-Non-Active-Time.

The first serving cells of the UE are the PCell and configured SCells.

The second serving cells of the UE are the PCell and activated SCells.

SCells are activated or deactivated by a L2-SCELL-Activation-Deactivation-MAC-CE. SCells are deactivated by a sCellDeactivationTimer. SCells are activated or deactivated by sCellState indicated in L3-RRC-Reconfiguration.

Figure 2B:
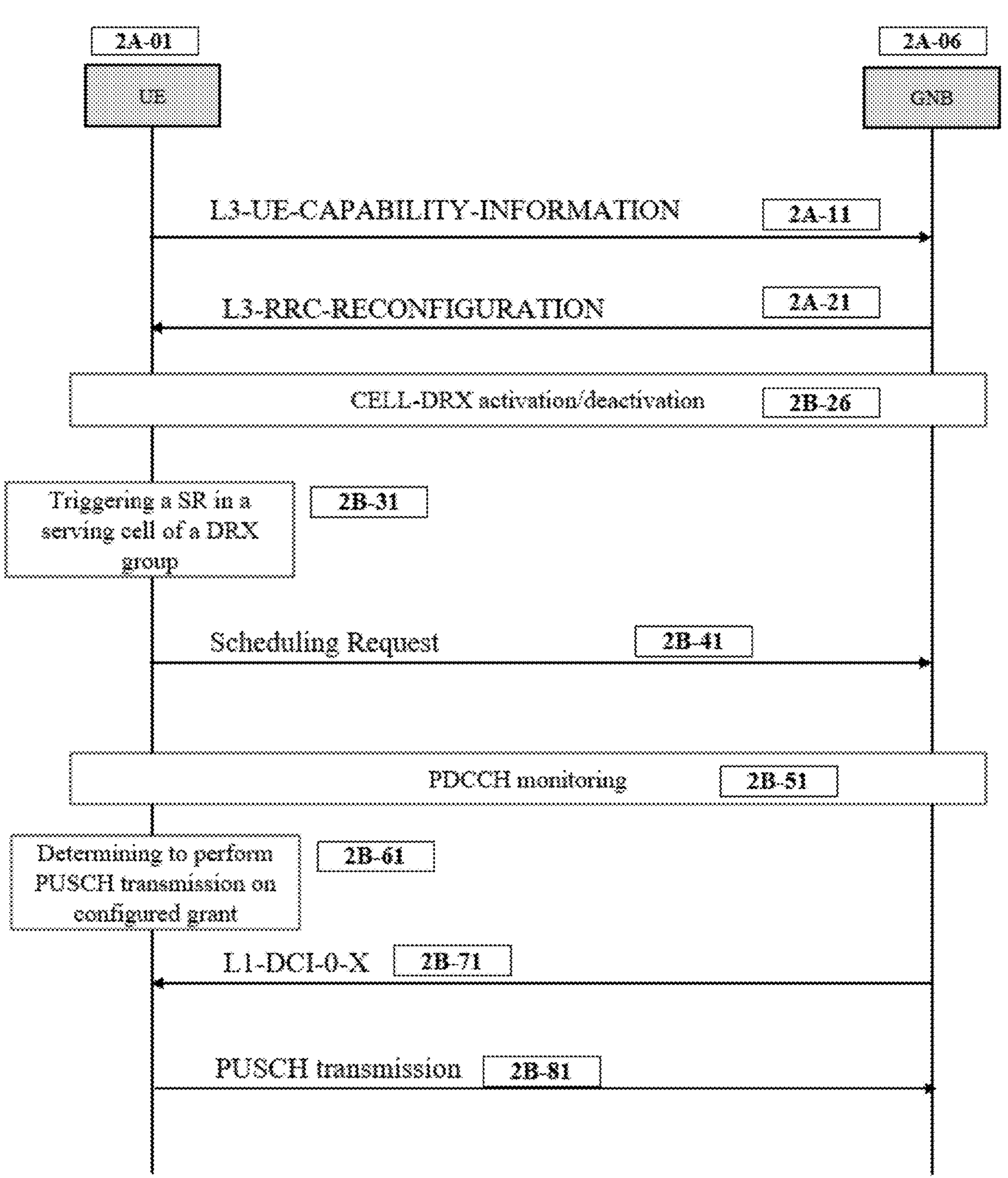
FIG. 2B is a diagram illustrating operations of a terminal and a base station according to an embodiment of the present invention.

FIG. 2B illustrates the operations of UE and base station when CELL-DRX is configured.

UE 2A-01 and GNB 2A-06 performs uplink transmission in a one or more serving cells.

UE transmits to GNB a L3-UE-CAPABILITY-INFORMATION in PCell 2A-11.

GNB transmits a L3-RRC-RECONFIGURATION to the UE 2A-21.

At 2B-26, UE and GNB activate or deactivate CELL-DRX.

UE shall, for each serving cell of a DRX group:

1: if CELL-DRX is not configured for the serving cell;

2: consider CELL-DRX is deactivated for the serving cell (i.e. cell-drx-onduration-timer of the serving cell is considered always running);

1: if CELL-DRX is configured for the serving cell;

2: if L3-RRC-RECONFIGURATION indicates CELL-DRX of the serving cell is activated; or 2: if L1-DCI-2-8 indicating CELL-DRX activation of the serving cell is receive d;

3: consider CELL-DRX is activated for the serving cell;

3: start cell-drx-onduration-timer of the serving cell at a specific slot determined based on cell_drx_CycleStartOffset and cell_drx_slot_offset of the CELL_DRX_CONFIGURATION;

2: if L3-RRC-RECONFIGURATION indicates CELL-DRX of the serving cell is deactivated; or 2: if L1-DCI-2-8 indicating CELL-DRX deactivation of the serving cell is received;

3: consider CELL-DRX is deactivated for the serving cell (i.e. cell-drx-onduration-timer of the serving cell is considered always running).

At 2B-31, UE triggers an SR in a serving cell of a DRX group.

SR is transmitted in PUCCH of a special cell.

SR is one bit information indicating whether uplink grant for new transmission is required or not.

UE triggers SR for:

1: regular BSR; or

1: for beam failure recovery; or

1: for positioning measurement gap activation/deactivation request.

The Buffer Status reporting (BSR) procedure is used to provide the serving gNB with information about UL data volume in the UE.

Regular BSR is triggered:

1: UL data, for a logical channel which belongs to an LCG, becomes available to the MAC entity; and either 2: this UL data belongs to a logical channel with higher priority than the priority of any logical channel containing available UL data which belong to any LCG; or 2: none of the logical channels which belong to an LCG contains any available UL data.

If a Regular BSR has been triggered and if there is no UL-SCH resource available for a new transmission, UE triggers a SR.

At 2B-41, UE transmits a SR if the following conditions are met.

UE shall:

1: if valid PUCCH resource is configured for the pending SR in the currently active uplink BWP of the PCell;

2: if CELL-DRX is not configured for the PCell; or

2: if CELL-DRX is configured for the PCell and CELL-DRX is not activated for the PCell; or 2: if CELL-DRX is configured for the PCell and CELL-DRX is activated for the PCell and cell_drx_onDurationTimer of the PCell is running;

3: transmit the SR on the next valid PUCCH resource for the SR;

2: if CELL-DRX is configured for the PCell and CELL-DRX is activated for the PCell and cell_drx_onDurationTimer of the PCell is not running;

3: transmit the SR on the first valid PUCCH resource for the SR when cell_drx_onDurationTimer of the PCell starts.

At 2B-51, UE performs PDCCH monitoring to receive uplink grant issued for the SR.

If scheduling request is sent on PUCCH of PCell and is pending, UE monitors PDCCH for uplink grant for new initial transmission if one of following conditions is met:

1: if CELL-DTX is not configured for at least one serving cell of the primary DRX group; or 1: if CELL-DTX is configured for all serving cells of the primary DRX group; and if CELL-DTX is not activated for any serving cell of the primary DRX group; or 1: if CELL-DTX is configured for all serving cells of the primary DRX group; and if CELL-DTX is activated for all serving cells of the primary DRX group; and if cell-dtx-onduration-timer of at least one serving cell of the primary DRX group is running.

If scheduling request is sent on PUCCH of PCell and is pending and if the following conditions are met, UE suspend PDCCH monitoring for uplink grant for new initial trans mission until the conditions are resolved:

1: if CELL-DTX is configured for all serving cells of the primary DRX group; and 1: if CELL-DTX is activated for all serving cells of the primary DRX group; and 1: if cell-dtx-onduration-timer of no serving cell of the primary DRX group is running.

In other words, UE starts monitoring PDCCH for uplink grant for new initial trans mission when cell-dtx-onduration-timer of at least one serving cell of the primary DRX group starts.

If configured grant occurs in any serving cell of the primary DRX group, UE deter mines whether to use the configured grant or not 2B-61.

UE shall:

1: if CELL-DRX is not configured for the serving cell; or

1: if CELL-DRX is configured for the serving cell; and if the CELL-DRX is not activated for the serving cell; or 1: if CELL-DRX is configured for the serving cell; and if the CELL-DRX is activated for the serving cell; and if cell-drx-onduration-timer of the serving cell is running;

2: perform PUSCH transmission on the configured grant; and

2: cancel the triggered SR if MAC PDU of the PUSCH transmission includes a specific L2-MAC-CE.

UE shall:

1: if CELL-DRX is configured for the serving cell; and if the CELL-DRX is activated for the serving cell; and if cell-drx-onduration-timer of the serving cell is not running;

2: not perform PUSCH transmission on the configured grant.

If L1-DCI-0-0 or L1-DIC-0-1 or L1-DCI-0-2 is received (e.g. dynamic grant for new transmission occurs) 2B-71, UE performs PUSCH transmission based on the received dynamic grant even if cell-drx-onduration-timer of the serving cell is not running. UE cancel the triggered SR if MAC PDU of the PUSCH transmission includes a specific L2-MAC-CE.

The specific L2-MAC-CE is:

1: if the SR was triggered for a regular BSR;

2: containing buffer status up to the last event that triggered the BSR;

1: if the SR was triggered for beam failure recovery;

2: BFR MAC CE;

1: else if the SR was triggered for positioning measurement gap activation/deactivation request;

2: Positioning Measurement Gap Activation/Deactivation Request MAC CE that triggers the SR.

UE performs followings for PDCCH monitoring.

1: UE receives a RRC message from a base station;

2: The RRC message includes for each DRX group;

3: initial value for drx-RetransmissionTimerUL and initial value for drx-onDurationTimer;

3: one or more initial values for cell-dtx-onduration-timer;

4: each of one or more initial values for cell-dtx-onduration-timer is associated with a serving cell;

1: A DRX group is group of serving cells of which PDCCH monitoring occurs simultaneously based on a set of same DRX configuration (A DRX group is a group of serving cells that operates based on same set of DRX configuration parameters and same set of events);

1: UE monitors PDCCH for a first DCI set or a second DCI set considering a drx-onDurationTimer and m drx-RetransmissionTimerULs and n cell-dtx-onduration-timers;

2: the first DCI set comprises DCI for PUSCH scheduling and DCI for PDSCH scheduling and DCI related with a cell-dtx-onduration-timer;

2: the second DCI set comprises DCI related with a cell-dtx-onduration-timer;

2: the total number of drx-onDurationTimer of a DRX group is one;

2: the total number of drx-RetransmissionTimerULs of the DRX group is equal to the number of UL HARQ process of the second cells of the DRX group;

2: the total number of cell-dtx-onduration-timer of the DRX group is equal to the number of second cells of the DRX group;

2: the second cell of a DRX group is a serving cell of the DRX group that is activated based on a L2-MAC-CE or a L3-RRC-Reconfiguration;

2: UE monitors PDCCH for the first DCI set for a DRX group;

3: if the drx-onDurationTimer of the DRX group is running and a cell-dtx-onduration-timer of at least one second cell is running; or 3: if a drx-RetransmissionTimerUL of the at least one UL HARQ process of at least one second cell of the DRX group is running;

2: UE monitors PDCCH for the second DCI set for the DRX group;

3: if the drx-onDurationTimer of the DRX group is running and a cell-dtx-onduration-timers of all second cell are not running; and 3: if a drx-RetransmissionTimerULs of all UL HARQ process of all second cell of the DRX group are not running;

UE performs followings for PDCCH monitoring.

1: UE receives a RRC message from a base station;

1: UE monitors PDCCH for a first DCI set or a second DCI set considering a drx-InactivityTimer and m drx-RetransmissionTimerDL and n Cell-dtx-offduration-timer;

2: the first DCI set comprises DCI for PUSCH scheduling and DCI for PDSCH scheduling and DCI related with a Cell-dtx-offduration-timer;

2: the second DCI set comprises DCI related with a Cell-dtx-offduration-timer;

2: the number of drx-InactivityTimer of a DRX group is one;

2: the number of drx-RetransmissionTimerDL of the DRX group is equal to the number of UL HARQ process of the second cells of the DRX group;

2: the number of Cell-dtx-offduration-timer of the DRX group is equal to the number of second cells of the DRX group for which cell-level-dtx is activated;

2: the second cell of a DRX group is a serving cell of the DRX group that is activated based on a L2-MAC-CE or a L3-RRC-Reconfiguration;

2: UE monitors PDCCH for the first DCI set for a DRX group;

3: if the drx-InactivityTimer of the DRX group is running and a Cell-dtx-offduration-timer of at least one second cell is not running; or 3: if a drx-RetransmissionTimerDL of the at least one UL HARQ process of at least one second cell of the DRX group is running;

2: UE monitors PDCCH for the second DCI set for the DRX group;

3: if the drx-InactivityTimer of the DRX group is running and a Cell-dtx-offduration-timers of all second cell are running; and 3: if a drx-RetransmissionTimerDLs of all UL HARQ process of all second cell of the DRX group are not running;

1: UE receives a RRC message from a base station;

2: the RRC message includes;

3: for each uplink BWP of the PCell;

4: PUCCH resource information for SR;

3: for each SCell;

4: an information indicating whether the SCell belongs to secondary DRX group;

3: for each serving cell (both PCell and SCell);

4: initial value for cell-dtx-onduration-timer;

4: an information related to time point when cell-dtx-onduration-timer starts;

1: UE triggers a SR for regular BSR;

1: UE transmits the SR based on that downlink information activating cell-dtx of PCell was received and cell-dtx-onduration-timer of PCell is running;

1: UE monitors PDCCH based on that downlink information activating cell-dtx of at least one serving cell of primary DRXa group was received and cell-dtx-onDuration-timer of at least one serving cell of primary DRX group is running;

1: UE cancels the triggered SR based on that MAC CE containing buffer status up to the last event that triggered the BSR is transmitted.

1: UE receives a RRC message from a base station;

2: the RRC message includes;

3: for each uplink BWP of the PCell;

4: PUCCH resource information for SR;

3: for each SCell;

4: an information indicating whether the SCell belongs to secondary DRX group;

3: for each serving cell (both PCell and SCell);

4: initial value for cell-dtx-onduration-timer;

4: information related to time point when cell-dtx-onduration-timer starts;

4: information indicating whether CELL-DTX and/or CELL-DRX is configured for the serving cell;

1: UE triggers a SR for beam failure recovery;

1: UE transmits the SR based on that downlink information activating cell-drx of PCell was received and cell-drx-onduration-timer of PCell is running;

1: UE monitors PDCCH based on that downlink information activating cell-dtx of at least one serving cell of primary DRXa group was received and cell-dtx-onDuration-timer of at least one serving cell of primary DRX group is running;

1: UE cancels the triggered SR based on that MAC CE containing beam failure related information is transmitted.

1: UE receives a RRC message from a base station;

2: the RRC message includes;

3: for each uplink BWP of the PCell;

4: PUCCH resource information for SR;

3: for each SCell;

4: an information indicating whether the SCell belongs to secondary DRX group;

3: for each serving cell (both PCell and SCell);

4: initial value for cell-dtx-onduration-timer;

4: information related to time point when cell-dtx-onduration-timer starts;

4: information indicating whether CELL-DTX and/or CELL-DRX is configured for the serving cell;

1: UE triggers a SR for positioning measurement gap activation/deactivation request;

1: UE determines whether to transmit SR;

2: if CELL-DRX is not configured for the PCell or if CELL-DRX is configured but not activated for the PCell;

3: UE determines SR transmission without considering cell-drx-onduration-timer of the PCell;

2: if CELL-DRX is configured and activated for the PCell;

3: UE determines SR transmission considering cell-drx-onduration-timer of the PCell;

1: UE transmits SR in the PUCCH resource configured for SR in the active uplink BWP of the PCell;

1: UE monitors PDCCH for the transmitted SR;

2: if CELL-DTX is not configured for any serving cell of primary DRX group; or

2: if CELL-DTX is configured for at least one serving cell of primary DRX group and CELL-DTX is not activated for any serving cell of primary DRX group;

3: UE determines PDCCH monitoring for transmitted SR without considering cell-dtx-onduration-timers of serving cells of the primary DRX group;

2: if CELL-DTX is configured for at least one serving cell of primary DRX group and CELL-DTX is activated for at least one serving cell of primary DRX group;

3: UE determines PDCCH monitoring for transmitted SR considering cell-dtx-onduration-timers of serving cells of the primary DRX group;

1: UE cancels the triggered SR based on that MAC CE containing positioning measurement gap activation/deactivation request is transmitted.

Figure 3A:
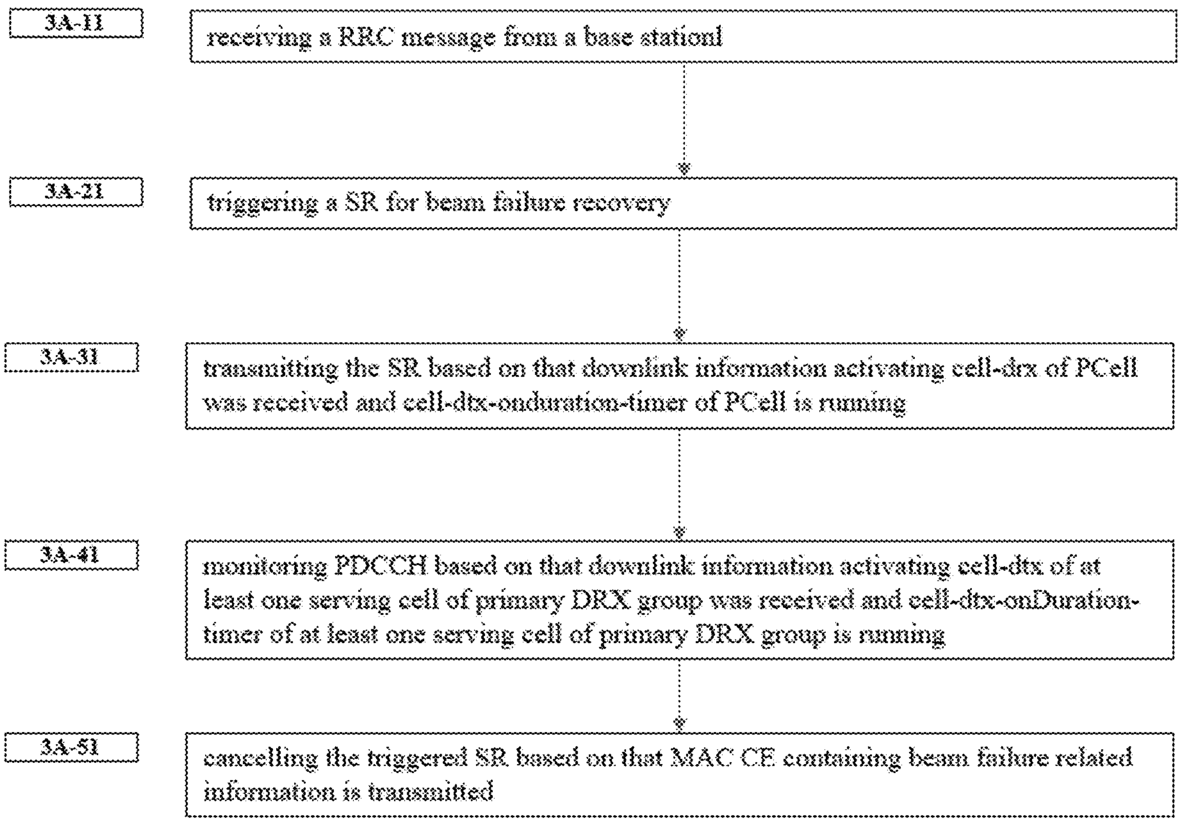
FIG. 3A is a flow diagram illustrating an operation of a terminal.

FIG. 3A illustrates operation of terminal.

At 3A-11, UE receives a RRC message from a base station; The RRC message includes C-DRX parameters for a DRX group and CELL-DTX parameters for each serving cell CELL-DRX parameters for each serving cell and PUCCH configuration information for PCell.

At 3A-21, UE triggers a SR for beam failure recovery.

At 3A-31, UE transmits the SR based on that downlink information activating cell-drx of PCell was received and cell-drx-onduration-timer of PCell is running.

At 3A-41, UE monitors PDCCH based on that downlink information activating cell-dtx of at least one serving cell of primary DRX group was received and cell-dtx-onDuration-timer of at least one serving cell of primary DRX group is running.

At 3A-51, UE cancels the triggered SR based on that MAC CE containing beam failure related information is transmitted.

Figure 4A:
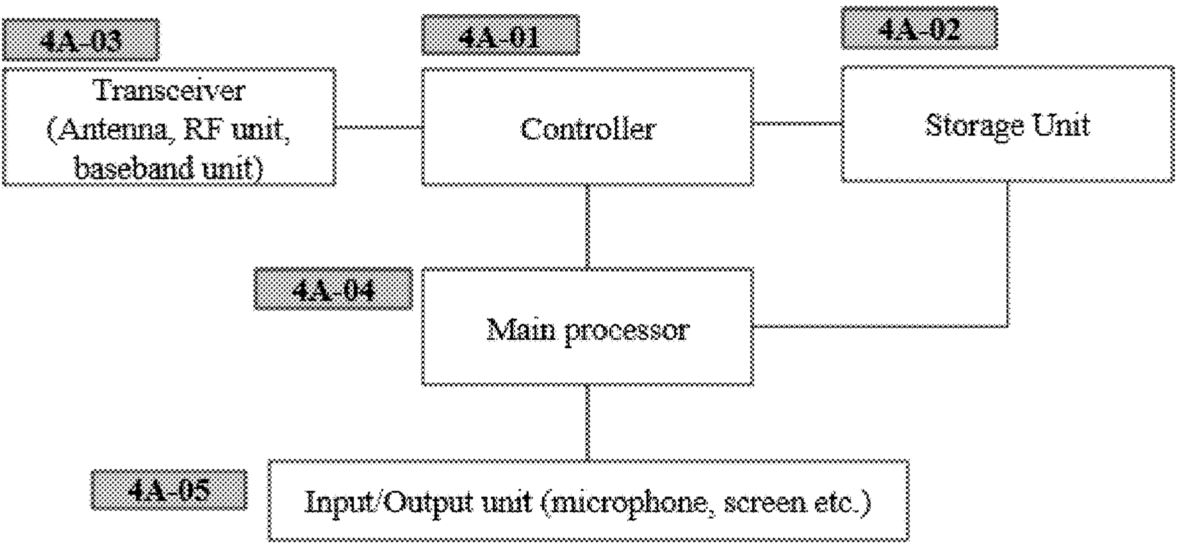
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage un it 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 2B and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MI MO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
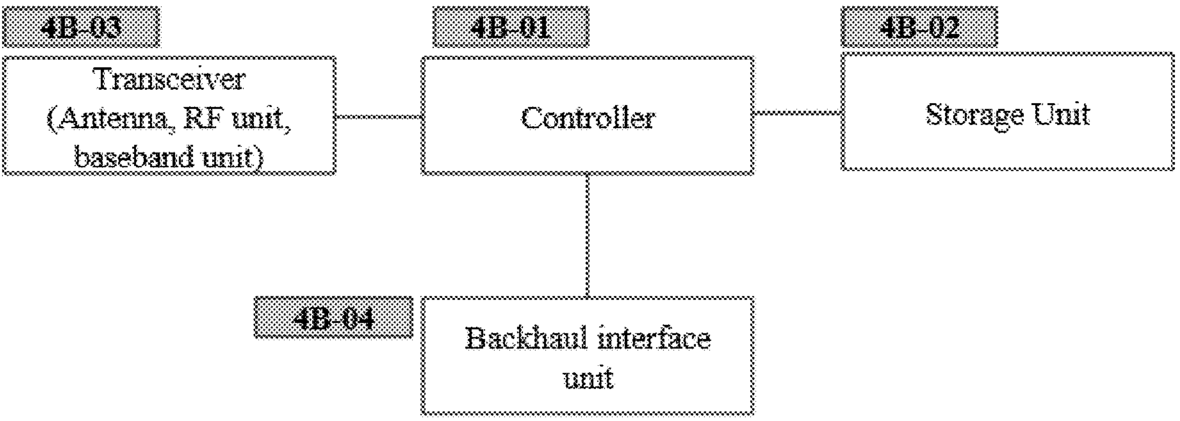
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A and FIG. 2B are performed.

The storage unit 4B-02 stores data for operation of the main base station, such as abasic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string trans mitted from the base station to another node, for example, another base station or a core net work, into a physical signal, and converts a physical signal received from the other node in to a bit string.

Below table lists acronym used in the present invention.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |

TABLE 1-continued

| Acronym | Full name | Acronym | Full name |
|---|---|---|---|
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A method by a terminal, the method comprising:

receiving, by the terminal, a radio resource control (RRC) reconfiguration message;

receiving, by the terminal, specific downlink control information;

activating, by the terminal, cell discontinuous transmission (DTX) for a specific serving cell based on the specific downlink control information;

performing physical downlink control channel (PDCCH) monitoring for the specific serving cell based on whether a cell-dtx-timer of the specific serving cell is running;

triggering, by the terminal, a Scheduling Request (SR) for beam failure recovery;

transmitting, by the terminal, the SR in case that:

cell discontinuous reception (DRX) is activated for the specific serving cell; and the cell-drx-timer of the specific serving cell is running;

performing PDCCH monitoring for the specific serving cell regardless of whether the cell-dtx-timer of the specific serving cell is running;

transmitting, by the terminal, a medium access control (MAC) control element (C E) comprising beam failure related information; and canceling, by the terminal, the SR triggered for beam failure recovery, wherein the specific serving cell is Primary Cell (PCell).

2. The method of claim 1, wherein the transmitting the SR is performed in case that:

cell DRX is not configured for the specific serving cell; or cell DRX is configured and not activated for the specific serving cell.

3. The method of claim 1, wherein cell DRX is activated for the specific serving cell in case that the specific downlink control information instructing activation of the cell DRX of the specific serving cell is received.

4. The method of claim 1, wherein the RRC reconfiguration message comprises:

a serving cell configuration for the PCell; and one or more serving cell configurations for one or more SCells.

5. The method of claim 4, wherein the serving cell configuration for the PCell comprises:

one or more SR configurations;

a parameter for on-duration-timer;

a parameter for subframe offset and cycle; and a parameter for slot offset.

6. The method of claim 4, wherein the RRC reconfiguration message further comprises:

a parameter related to identifying cell in the specific downlink control information; and a parameter related to cyclic redundancy check (CRC) of the specific downlink control information.

7. The method of claim 6, wherein cell DRX for the specific cell is activated based on reception of the specific downlink control information.

8. The method of claim 7, wherein:

the specific downlink control information is received based on the parameter related to CRC;

a block corresponding to the PCell is determined based on the parameter related to identifying cell; and the block corresponding to the PCell is set to a first value.

9. The method of claim 5, wherein cell-drx-timer of the specific cell starts at a specific slot that is determined based on:

the parameter for subframe offset and cycle; and the parameter for slot offset.

10. The method of claim 9, wherein:

a duration of the cell-drx-timer of the specific cell is determined by the parameter for on-duration-timer.

11. The method of claim 1, wherein:

the terminal performs PDCCH monitoring for one or more specific SCells in case that PDCCH monitoring is due to transmission of SR; and the one or more specific SCells belong to a primary DRX group.

12. A terminal comprising:

a transceiver, a memory, and a controller coupled to the transceiver and the memory, wherein the controller is configured to cause the terminal to:

receive a radio resource control (RRC) reconfiguration message;

receive a specific downlink control information;

activate cell discontinuous transmission (DTX) for a specific serving cell based on the specific downlink control information;

perform physical downlink control channel (PDCCH) monitoring for the specific serving cell based on whether a cell-dtx-timer of the specific serving cell is running;

trigger a Scheduling Request (SR) for beam failure recovery;

transmit the SR in case that:

cell discontinuous reception (DRX) is activated for the specific serving cell; and the cell-drx-timer of the specific serving cell is running;

perform PDCCH monitoring for the specific serving cell regardless of whether the cell-dtx-timer of the specific serving cell is running;

transmit a medium access control (MAC) control element (CE) comprising beam failure related information; and cancel the SR triggered for beam failure recovery, wherein the specific serving cell is Primary Cell (PCell).

* * * * *